(12) United States Patent
Moretto

(10) Patent No.: US 9,663,263 B2
(45) Date of Patent: May 30, 2017

(54) EMPTYING DEVICE FOR STORAGE CONTAINERS OF GRANULAR MATERIALS OR THE LIKE

(71) Applicant: Renato Moretto, Massanzago (IT)

(72) Inventor: Renato Moretto, Massanzago (IT)

(73) Assignee: MORETTO S.P.A., Mazzanzago (PD) (IT)

(*) Notice: Subject to any disclaimer, the term of this patent is extended or adjusted under 35 U.S.C. 154(b) by 144 days.

(21) Appl. No.: 14/411,511

(22) PCT Filed: Jul. 10, 2013

(86) PCT No.: PCT/IB2013/055654
§ 371 (c)(1),
(2) Date: Dec. 28, 2014

(87) PCT Pub. No.: WO2014/009889
PCT Pub. Date: Jan. 16, 2014

(65) Prior Publication Data
US 2015/0158616 A1 Jun. 11, 2015

(30) Foreign Application Priority Data

Jul. 13, 2012 (EP) .................................... 12176469
Aug. 1, 2012 (IT) ............................... VI2012A0195

(51) Int. Cl.
*B65G 65/30* (2006.01)
*B65B 69/00* (2006.01)
*B65G 65/36* (2006.01)

(52) U.S. Cl.
CPC .......... *B65B 69/0075* (2013.01); *B65G 65/36* (2013.01)

(58) Field of Classification Search
CPC ........ B65G 65/36; B65G 53/24; B65G 53/26; B65B 69/0075; B65B 69/0083
USPC .......................... 406/114, 151; 414/403, 423
See application file for complete search history.

(56) References Cited

U.S. PATENT DOCUMENTS

| 1,362,560 A | * | 12/1920 | Coe ......................... B66C 13/00 212/319 |
| 4,029,364 A | * | 6/1977 | Salzer .................... B65G 53/22 406/115 |
| 4,167,235 A | * | 9/1979 | Green ................. B65B 69/0083 222/105 |

(Continued)

FOREIGN PATENT DOCUMENTS

| DE | 4124911 | 1/1993 |
| EP | 2380813 | 10/2011 |

*Primary Examiner* — Joseph Dillon, Jr.
(74) *Attorney, Agent, or Firm* — Themis Law

(57) ABSTRACT

An emptying device of a storage container of granular material and the like is provided with an access opening. The emptying device includes a support body; a suction head of the granular material; two or more lifting groups associated with the support body and susceptible to grab and lift the access opening; moving elements of the lifting groups designed to move a first lifting group by a movement which is independent with respect to a second lifting group; a control device of the moving elements configured to automate the movements of the lifting groups according to predetermined sequences in order to move, independently from each other, different portions of the storage container and to channel the granular material towards the suction head.

9 Claims, 3 Drawing Sheets

(56) References Cited

U.S. PATENT DOCUMENTS

| | | | | |
|---|---|---|---|---|
| 4,966,311 A | * | 10/1990 | Taylor | B65B 69/0091 |
| | | | | 222/105 |
| 5,037,246 A | * | 8/1991 | Okano | B65G 53/42 |
| | | | | 406/113 |
| 5,271,695 A | * | 12/1993 | Bischof | B05B 7/1445 |
| | | | | 406/114 |
| 5,382,117 A | * | 1/1995 | Rings | A47L 15/44 |
| | | | | 222/105 |
| 5,944,455 A | * | 8/1999 | Wilhelm | B65B 69/0075 |
| | | | | 406/141 |
| 5,975,351 A | * | 11/1999 | DeLacerda | B65B 69/0075 |
| | | | | 222/1 |
| 6,036,408 A | | 3/2000 | Wilhelm | |
| 6,340,100 B1 | * | 1/2002 | Gill | B65B 69/0075 |
| | | | | 141/315 |
| 6,979,166 B2 | * | 12/2005 | Ours | B65B 69/0075 |
| | | | | 406/114 |
| 8,147,169 B1 | * | 4/2012 | Kvalheim | B65G 53/40 |
| | | | | 406/109 |
| 8,764,367 B2 | * | 7/2014 | McCabe | B66C 1/58 |
| | | | | 198/468.01 |
| 8,936,426 B2 | * | 1/2015 | Peterson | B66C 3/06 |
| | | | | 414/423 |
| 2008/0187423 A1 | * | 8/2008 | Mauchle | B05B 7/1454 |
| | | | | 414/415 |
| 2011/0258967 A1 | * | 10/2011 | Dietrich, Jr. | B65B 31/024 |
| | | | | 53/432 |

\* cited by examiner

EMPTYING DEVICE FOR STORAGE CONTAINERS OF GRANULAR MATERIALS OR THE LIKE

DEFINITIONS

In the present document, the terms "granules" or "granular" indicate also the small flakes, foils or plates produced through the grinding and/or the chipping of plastic material into foil, sheet film or the like.

FIELD OF INVENTION

The present invention relates to plants processing plastic materials and, in particular, it relates to the feeding group of a plant with granular material and the like.

More in details, the present invention relates to an emptying device of storage containers of granular materials and the like.

BACKGROUND ART

In the plants for processing and/or transforming the plastic materials into granules, the granular material is typically moved from a storage container into one or more utilization machines, usually composed by injection presses or by thermoforming presses, by using a plant with a pneumatic channeling system.

The latter preferably use of the depression technique to pick up from specific containers the granular material mentioned above.

In particular, according to the prior art, the devices for pneumatic channeling comprise an emptying device of storage containers of granular material or the like equipped with a vacuum source, for example a vacuum pump that generates a low pressure which is directed towards the storage container by using a specific suction head. As a consequence, this low pressure provoques the suction of the air and, together with it, of granular material of the container.

The material is carried by the air along specific pipes towards a collection tank named receiver or feeder. On the other hand, the air carrying the granular material is directed towards the vacuum source.

The storage container holding the granular material to be carried is typically made of a nylon sack (or any other material with a polymer basis), placed inside another container, typically made by paperboard or any other equivalent material with the same rigidity. In other cases, different containers are used, for example the typology called big bag.

One of the most difficult problems to be solved in the pneumatic transportation by suction of the granular material is to carry all the material contained in the storage container without leaving leftovers.

According to the prior art this is avoided by an operator who carries moves the suction head so that it can pick up also the left granular material.

It is evident that this solution has the drawback of needing the presence of an operator that increase the production costs.

Consequently, they are known emptying devices of storage containers provided with automatic moving groups of the suction head so that this head can get up to the bottom of the sack.

This solution, even though it decreases the leftover of granular material in the sack at the end of the picking-up operation, it does not permit to reduce this leftover to the minimum or to completely eliminate it.

They are so known emptying devices having a ring holding the access opening of the sack in order to lift it during the suction of the material contained in it. In this way, the sack is totally lifted and this lifting leads to the channeling of the material towards the suction head.

However, since the majority of the sacks is thermowelded in the inferior part, their complete lifting does not provoque the deformation of the basis and, as a consequence, it does not permit to move the leftovers of granular material towards the suction head.

SUMMARY OF THE INVENTION

The object of the present invention is to overcome, at least partially, the drawbacks mentioned above, by making available an emptying device of a storage container of granular material and the like which permits, compared to the know similar devices, to minimize, or to totally eliminate, the leftovers of granular material present in the containers at the end of suction process.

Another object of the present invention is to make available an emptying device of a storage container of granular material and the like which, even though it minimizes or eliminates the leftovers of granular material present in the containers at the end of the suction process, maintains the operative costs at least the same as those for the equivalent known machines.

In particular, an object of the present invention is to make available an emptying device of a storage container of granular material and the like which does not need the constant presence of an operator.

Another object of the present invention is to make available an emptying device of a storage container of granular material and the like which, even though it minimizes or eliminates the leftover of granular material present in the container at the end of the suction process, have operative costs at least the same as those incurred by equivalent emptying devices of the prior art.

These objects, and others who appear more clearly below, are achieved by an emptying device of a storage container of granular material and the like in accordance with the following claims that must be considered as an integral part of the present patent.

In particular, the emptying device operate on containers equipped with an access opening and include at least one support body.

According to an aspect of the invention, the emptying device include at least one suction head that can be moved from a rest position to an operative position in which that suction head can be placed at least next to the granular material in order to suck it.

According to another aspect of the invention, the emptying device comprises two or more lifting groups coupled to the support body and susceptible to grab and lift the access opening of the storage container. In this way, when the granular material will be below a predetermined level, at least one portion of the container will be lifted in order to facilitate the operation of channeling the residual granular material towards the suction head.

In order to favor this channeling movement, the device of the invention include moving means of the lifting groups designed so as to move at least one first of the lifting groups by an independent movement with respect to at least one second of said lifting groups. Besides this, there is also at least one control device of moving means to automate said movements of the lifting groups according to predetermined sequences.

This permits, advantageously, to move independently from each other single sections of the storage container and to channel the granular material towards the suction head. In case of sacks thermowelded in the inferior part, in fact, the sack can not be lifted completely. In particular, since in the device of the invention the lifting groups will not be able to lift themselves simultaneously, but in a sequence, the movement given from them to the sack will be substantially a waggle or, anyway, an inclination of the sack without operating its total lifting. This action can favor the movement of the granular material left towards the suction head.

Another advantage is that the operative and execution costs of the device of the invention will be kept under control and, in particular, the constant presence of an operator will be avoided.

From what has been said up to this point, the mentioned objects are reached also by a method of emptying of a storage container of granular material and the like provided with an access opening. This method comprises of the following steps:

- grabbing a plurality of portions of the access opening of the container;
- lifting at least one first sub-group of the portions of the opening access;
- lowering the first sub-group;
- lifting at least one second sub-group of the portions of the opening access;
- lowering the second sub-group.

BRIEF DESCRIPTION OF THE DRAWINGS

Further features and advantages of the invention will be more evident in the light of the detailed description of some preferred, including but not linon-exclusive, embodiments of an emptying device of a storage container of granular material and the like according to the invention, which is described as a non-limiting example with the help of the annexed drawings in which.

DETAILED DESCRIPTION OF A PREFERRED EXAMPLE OF REALISATION

Figure 1:
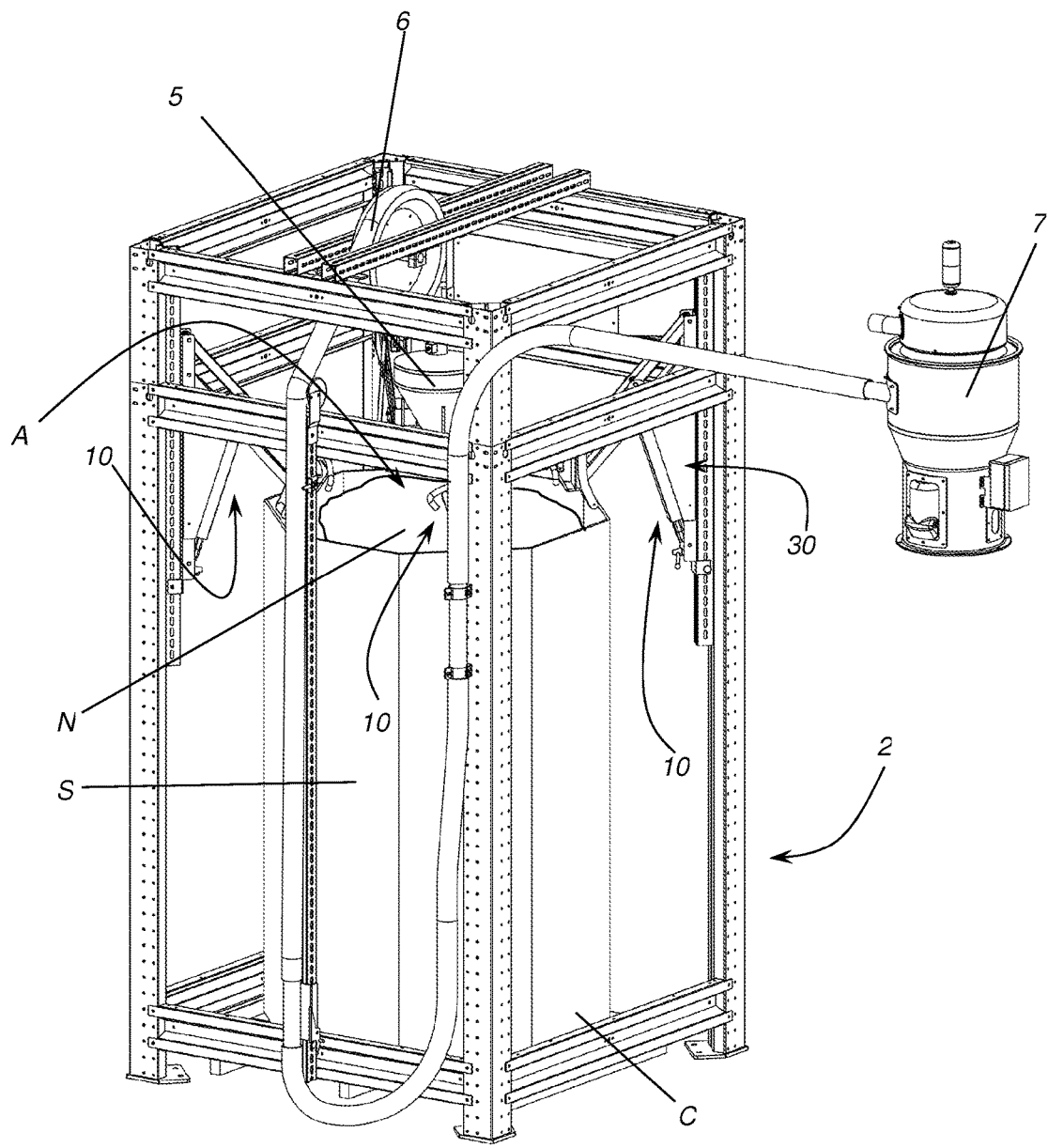
FIG. 1 represents an axonometric projection of an emptying device of storage containers of granular material according to the invention.

With reference to the cited figures and, in particular, with reference to FIG. 1, it is described an emptying device 1 of a storage container C of granular material and the like.

This device 1 is used typically, but not necessarily, in plants working with plastic materials. In any case, it includes a support body 2 in which the storage container C will be positioned.

Typically the support body 2 is composed, for example, by section bars or box-shaped or pipe-shaped elements, which are preferably aptly fixed one to the other in correspondence to one or more levels by means of struts so as to define the borders of an area within which the storage container C is contained.

The typology of the storage container C represented in the figure is named Octabin, i.e. it is composed by a nylon sack N, or equivalent polymeric material, contained within a second rigid container S. However, this shall not be considered a factor excluding realizations forms in which the storage container does not present additional external containers and is, for example, of the big bag typology.

According to another aspect of the invention, the emptying device 1 includes also a suction head 5 capable of being moved from a rest position, external to the container C and hanging over it, to an operative position internal to the container C and in proximity or in contact with the granular material to be sucked.

In order to operate the transport in suction modality of the granular material the suction head 5 is coupled to a pipe 6, which can be either rigid or flexible, whose other free end enters into an hermetic receiver 7.

The air transporting the granular material coming from the container C is separated from the granular material while falling into the receiver 7 and is possibly sucked by a filter and is channeled towards a vacuum source, that is towards the device responsible for the transportation by suction process.

It is easily understandable that the quantity of granular material sucked from the container C depends for the most part on the relative position of the suction head 5 and the container C.

According to another aspect of the invention, the emptying device 1 comprises two or more lifting devices 10 coupled to the support body 2. Their function is to grab and lift the access opening A of the storage container C. In this way it is possible to favour the channeling of the granular material towards the suction head 5.

Figure 2:
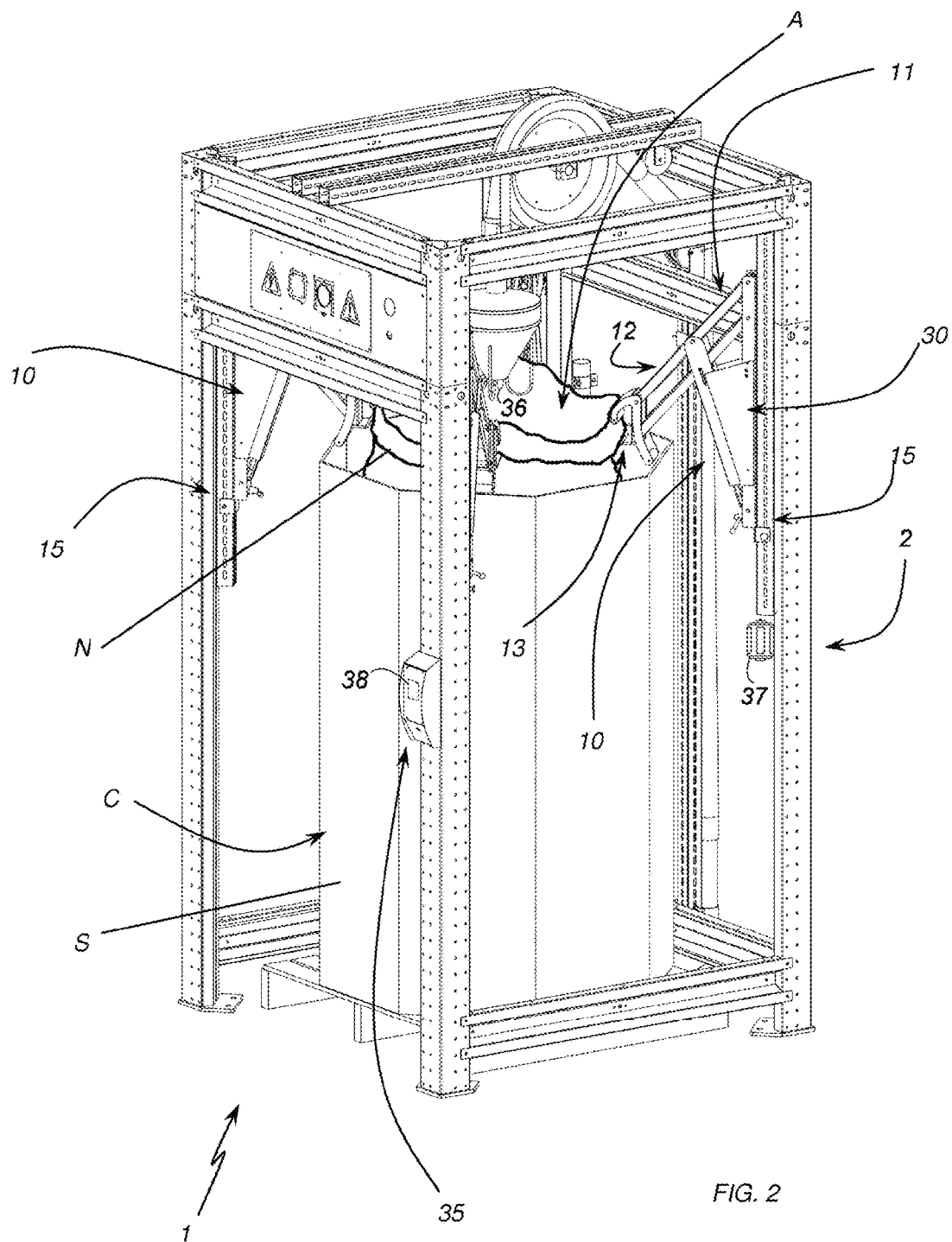
FIGS. 2 and 3 represent details of the emptying device of FIG. 1.

More in details, as it can be observed in FIG. 2, each lifting group 10 comprises one arm 11 constrained to the support body 2 and having a free end 12 provided with grab means 13. The grab means 13 are used to grab one portion of the edge of the access opening A of the container C.

In the figures it can be observed that the arm 11 includes one parallelogram, but also this particular shall not be considered binding for different realization forms.

Since the storage containers C can have different dimensions, each arm 11 opportunely has an assembly adjustment 15 of the height of the constraining point to the support body 2 to allow the adjusting of the position.

Figure 3:
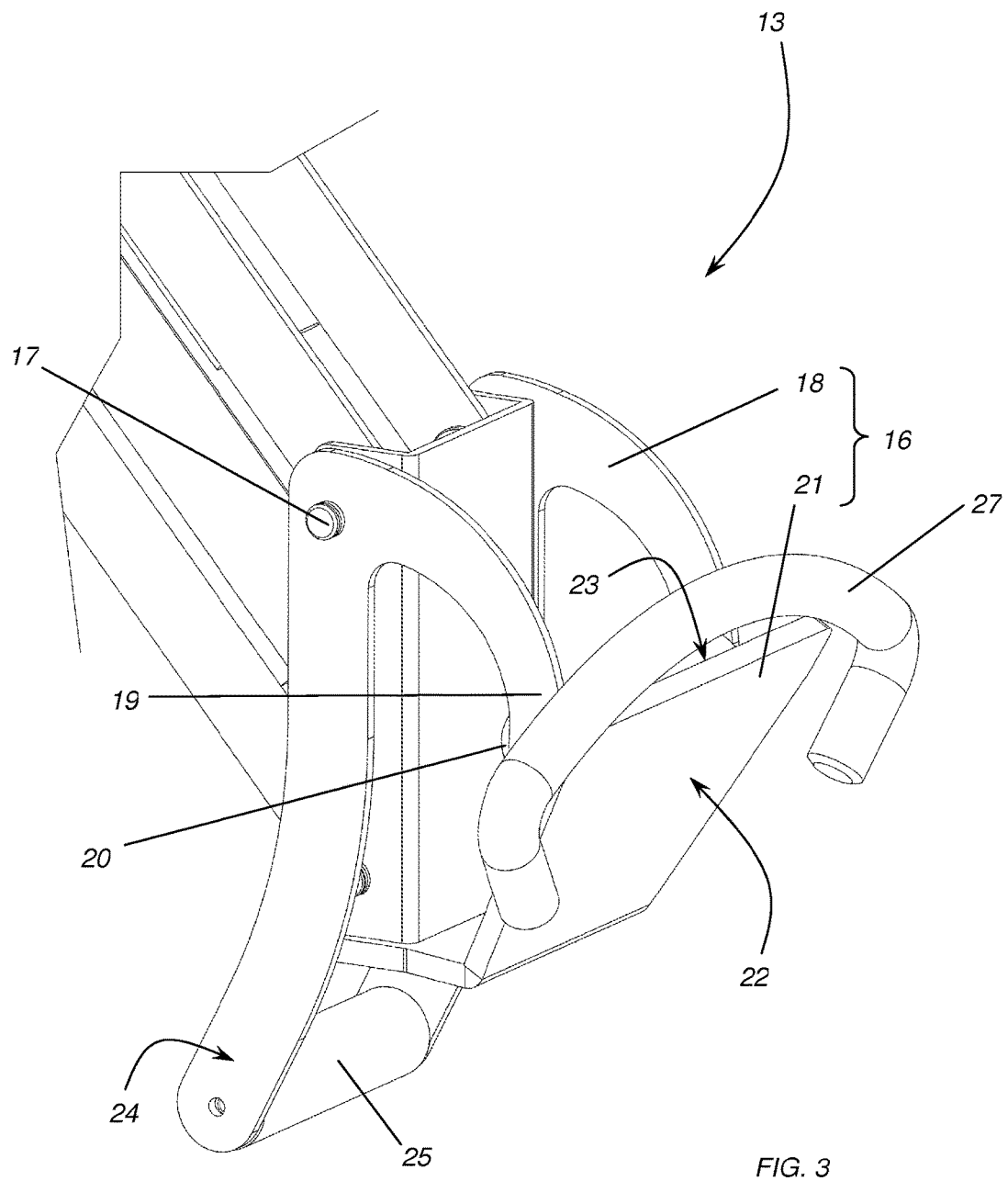

As concerns the grab means 13, in FIG. 3 it can be observed that they comprise a couple of jaws 16. One first jaw 18 screwed with a pivot 17 in order to make reciprocal movements with respect to the second jaw 21. It is also provided, at the working end 19, with one rough body 20. At the same time, the second jaw 21 is provided, at the working end 22, with an impact body 23 for the rough body 20.

In this way, the portion of the edge of the sack containing the granular material is placed between the rough body 20 and the impact body 23 and held by them. In order to permit this arrangement, the first jaw 18 is provided, at the control end 24, with a handle 25 for moving it toward the second jaw 21 by doing rotary movements with respect to the pivot 17 so as to move away the rough body 20 from the impact body 23 and to approach them.

It is understood that also the described embodiment of the grab means shall not be considered limiting for different embodiments in which, for example, the grab is obtained with jaws attached to the working ends.

In the figures it is also observed that there are four lifting groups 10, but also this characteristic shall not be considered limiting for different embodiments of the invention.

According to another aspect of the invention, since during the lifting of the storage container C, it can touch the external surfaces of the grab means 13 and since these surfaces could be cutting, the grab means 13 comprise one anti-tearing element 27 placed near the working ends 19, 22 of the jaws 18, 21. The anti-tearing element 27 is put in contact with the container C and it prevents the container from touching the grab means 13.

It has already been said that the lifting groups 10 grab and lift the access opening A of the storage container C.

In this way, the device 1 comprises moving means 30 of the lifting groups 10. They are designed in such a way so as to allow each of them to move the lifting groups 10 independently from the other ones. In this way, it is possible to move the container C without lifting it. In other words, the container C undergoes a series of upward drives which provoque its inclination in different directions. This corresponds to a substantial waggle which allows to successfully channel all the left granular material towards the suction head 5.

Typically, the lifting can happen by a rotary movement of the lifting groups 10 around an axis which is substantially horizontal or by a rotary-translational movement. However, also this characteristic shall not be considered limiting for different displacements of the lifting groups belonging to the device of the invention.

As concerns the realization form of the invention, the moving means 30 typically comprise a motor 37 for each of the lifting groups 10 so as to make easier the separate movement of each of them. However, this shall not be considered limiting for different embodiments in which, for example, the lifting groups are divided into two or more sub-groups each comprising one or more lifting groups and each is moved by its own motor 37. In this way, the motor 37 is responsible for the movement of more than one lifting groups. For example, there can be two sub-groups of lifting groups and each is moved with an independent motor so that the first sub-group lifts and lowers the relative access opening portions of the container independently from the similar movements transmitted from the second sub-group.

In the represented embodiment, each engine is located between the intermediate portion of the parallelogram superior clamp and the support body 2. With the linear range produced by the engine, the grab means 13 make a rotary movement from an inferior rest position to a superior operative position corresponding to the lifting of the edge portion of the access opening A of the container C.

According to another aspect of the invention, the emptying device 1 of the invention comprises also one control device of the moving means 30 in order to automate the movements of each lifting group 10 according to predetermined sequences. In this way, the advantage is that it is possible to move, independently from each other, different portions of the storage container C and to channel the granular material toward the suction head 5. In particular, it is possible to obtain a waggle effect of the container C that permits the channeling towards the head 5 of all the left material.

These movements of the lifting groups 10 can happen according to sequences that can be predetermined and that can be defined according to the typology of the container C and according to the typology of granular material contained in it. Conveniently, also the entity of the lifting movement operated by each lifting group 10 can be determined independently from the lifting movements of the other groups 10.

In other words, the emptying device 1 of the invention presents a plurality of lifting groups 10 for edge portions of the access opening A of the storage container C for granular material, each of these lifting groups can be moved independently from the other ones and with independent schedules and ranges. This allows to move portions of the container C without lifting it totally, but partially. Each lifting movement, as a consequence, permits the inclination of the container in a precise direction leading to the channeling of the left granular material in that precise direction and, in particular, toward the suction head 5.

In order to guarantee that the container C is not lifted, but only inclined, the suction head 5 comprises, inside it, a stabilizing mass in order to increase the stability of the head 5 itself and in order to push downward the part of the container C with which it comes in contact and, in such a way, it prevents the part of the container from lifting.

According to another aspect of the invention, the control device 35 comprises a programmable control logic unit 38 which allows automating the entire process excluding, in this way, the presence of an operator.

In this context, the emptying device 1 comprises also one sensor 36, which is operatively linked to the control logic unit; the sensor 36 carries out the function of determining the level of granular material left inside the container C so that, below a predetermined minimum level, the lifting groups 10 are activated.

Operatively, the storage container C is placed inside the support body 2 by coupling the edge of the access opening A to the grab means 13.

If necessary it is possible to regulate the height of these grab means 13 by acting on the adjustment assembly 15.

Then the suction head 5 is lowered in order to put it in contact with the granular material and after that the suction process is activated.

When the level of left granular material is below a predetermined level, the sensor sends a specific signal to the control device 35 which activates the pre-set sequence of movements of the lifting groups 10. For example, the arms 11 will be lifted in a sequence or by alternate couples, obtaining anyway the movement of the container C without its lifting. In other words, the container C is inclined in different directions and this leads to its substantial waggle which permits the channeling of the left granular material towards the suction head 5.

From what has been said up to this point, it can be inferred that the object of the invention is also a method for emptying a storage container C of granular material and the like.

The container C is obviously provided with an opening access A and the method consists of a first phase in which a plurality of edge portions of said access opening A are grabbed.

Then a first sub-group of these portions are lifted in order to bring about a lifting of one portion of the container C. Since the remaining part of the container is not lifted, the container has an inclined position with respect to the support surface.

In a successive phase, the first sub-group is lowered so as to bring about a waggle movement of the container C.

Likewise, one second sub-group of edge portions of the access opening is lifted and lowered in order to increase the waggle movement on the container C leading, as a consequence, to the channeling of the material towards the suction head 5. The lifting and lowering operations can be carried out more times.

It is self-evident that both the number of sub-groups of edge portions to be lifted and the number of portions for each sub-group are no limiting for the protection field of the present patent. Also the sequence of lifting and lowering movements of the different sub-groups is not limiting so as to allow the choice of the most suitable sequence for the container typology C and for the material typology contained in it.

In the light of the foregoing, it is understood that the emptying device of storage containers of granular material achieve the objectives set. In particular, the emptying device allows to reduce to the minimum and even to totally eliminate the left granular material present in the container at the end of the suction process.

Besides this, this result is reached by keeping the operative and execution costs at least the same as those incurred for the known equivalent devices.

In particular, the constant presence of an operator is not needed.

The emptying device of the invention is susceptible of a great number of changes and variations, all being part of the invention concept stated in the attached claims. All the different parts can be replaced by other technically equivalent elements and the materials can be different depending on the needs, all this can be operated without trespassing the invention field.

While the emptying device has been described with reference to the attached figures, the reference numbers used in the description and in the claims are used in order to figure out more easily the invention, but they are in no way limiting for the protection field claimed.

The invention claimed is:

1. An emptying device for storage containers of granular materials provided with an access opening, the emptying device comprising:
    at least one support body configured to house a storage container;
    at least one suction head configured to move from a rest position to an operative position in which the at least one suction head is arranged at least near a granular material to be sucked from the storage container;
    two or more lifting groups coupled to said support body and configured to grasp and lift an access opening of the storage container;
    moving elements of said lifting groups configured to move at least one first of said lifting groups with independent movements with respect to at least one second of said lifting groups; and
    at least one control device of said moving elements to automate said movements of said lifting groups according to predetermined sequences so as to move independently distinct portions of the storage container and convey the granular material towards said suction head.

2. The emptying device according to claim 1, wherein said control device comprises at least one logical control unit operatively connected to said moving elements.

3. The emptying device according to claim 2, further comprising one or more sensors operatively connected to said logical control unit at least for detecting a level of the granular material within the container and activate said moving elements.

4. The emptying device according to claim 1, wherein each of said lifting groups comprises at least one arm constrained to said support body and having a free end provided with pincers configured to grab at least one portion of an edge of the access opening of the container.

5. The emptying device according to claim 4, wherein said arm has an adjustment assembly of a height of a constraining point to said support body to allow adjusting a position of said pincers to a size of the storage container.

6. The emptying device according to claim 4, wherein said pincers comprise at least one pair of jaws mutually pivoted in a median zone thereof a first one of said jaws being provided, at a working end, with a rough body, a second one of said jaws being provided, at the working end, with an impact body for said rough body.

7. The emptying device according to claim 6, wherein at least one of said jaws is provided, at a control end, with a handle for moving reciprocally said jaws with respect to said pivot so as to close and to move away said rough body from said impact body.

8. The emptying device according to claim 6, wherein said pincers comprise at least one anti-tearing element placed near said working ends of said jaws to be put in contact to the access opening of the storage container, said anti-tearing element comprising a body that spaces lateral surfaces of said working ends of said jaws from the storage container, thereby preventing the access opening of the storage container from coming into contact with said lateral surfaces and preventing a tearing of the storage container by said lateral surfaces.

9. The emptying device according to claim 1, wherein said moving elements comprise at least one motor for each of said lifting groups.

* * * * *